(12) United States Patent
Furuhashi

(10) Patent No.: US 12,027,189 B2
(45) Date of Patent: Jul. 2, 2024

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Takao Furuhashi, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 18/119,636

(22) Filed: Mar. 9, 2023

(65) Prior Publication Data

US 2024/0096362 A1 Mar. 21, 2024

(30) Foreign Application Priority Data

Sep. 15, 2022 (KR) .............................. 2022-147233

(51) Int. Cl.
| | | |
|---|---|---|
| G11B 5/00 | (2006.01) | |
| G11B 5/54 | (2006.01) | |
| G11B 5/60 | (2006.01) | |
| G11B 11/105 | (2006.01) | |
| G11B 33/12 | (2006.01) | |

(52) U.S. Cl.
CPC ................ *G11B 5/607* (2013.01); *G11B 5/54* (2013.01); *G11B 33/121* (2013.01); *G11B 2220/2516* (2013.01)

(58) Field of Classification Search
CPC ......... G11B 5/6011; G11B 5/012; G11B 5/02; G11B 5/60; G11B 5/6029; G11B 20/10388; G11B 5/607; G11B 7/126; G11B 7/1263; G11B 2005/0021; G11B 20/1217; G11B 20/1232; G11B 20/10009; G11B 27/36; G11B 20/12; G11B 20/18; G11B 11/10506; G11B 11/1051
USPC .................................... 360/59, 13.33, 13.34
See application file for complete search history.

(56) References Cited

U.S. PATENT DOCUMENTS

| | | | |
|---|---|---|---|
| 7,239,470 B2 | 7/2007 | Takahashi et al. | |
| 8,730,608 B1 * | 5/2014 | Van Eaton | G11B 5/607 360/59 |
| 8,941,942 B2 | 1/2015 | Sato et al. | |
| 10,229,707 B2 | 3/2019 | Ishii | |
| 10,885,939 B1 | 1/2021 | Chiba | |
| 2007/0035881 A1 * | 2/2007 | Burbank | G11B 5/6005 360/234.3 |
| 2010/0259848 A1 | 10/2010 | Nanba | |

\* cited by examiner

*Primary Examiner* — Nabil Z Hindi
(74) *Attorney, Agent, or Firm* — Maier & Maier, PLLC

(57) ABSTRACT

According to one embodiment, a magnetic disk device includes a magnetic disk, a magnetic head including a write head which writes data to the magnetic disk, a read head which reads data from the magnetic disk, a first heater which adjusts a flying height of the write head, a second heater which adjusts a flying height of the read head and a controller which controls powers supplied to the first heater and the second heat, and controls a power value of the power supplied to the first heater according to a ratio between an electric resistance value of the first heater and an electric resistance value of the second heater.

8 Claims, 6 Drawing Sheets

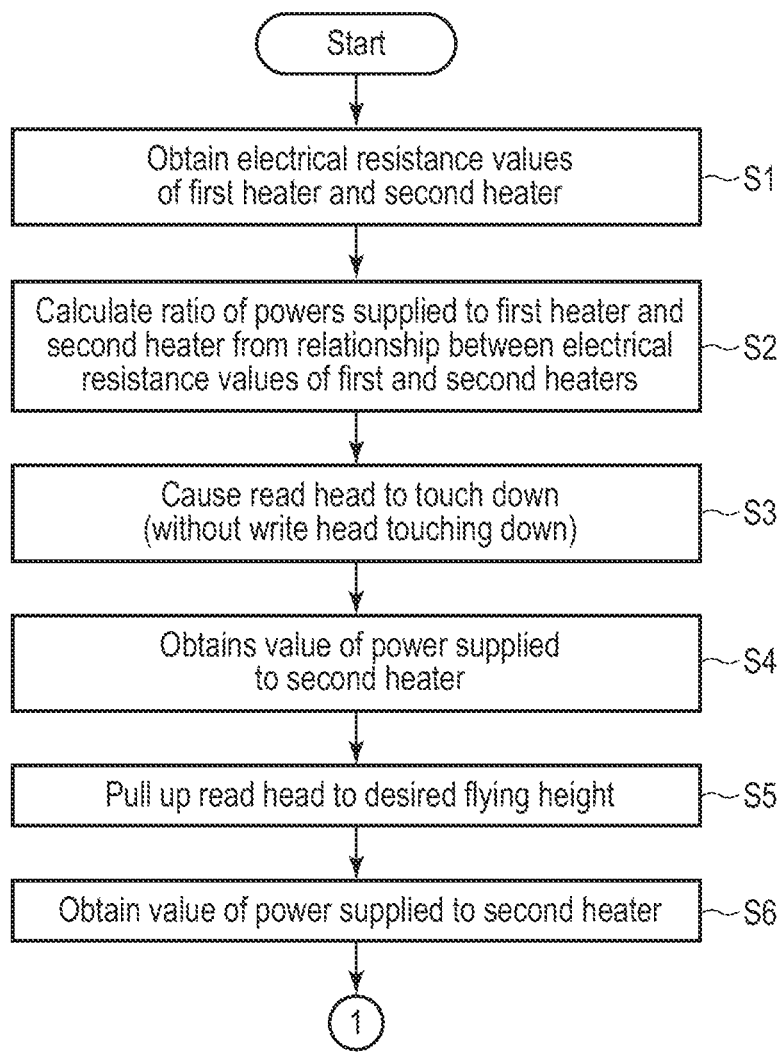
F I G. 5

MAGNETIC DISK DEVICE

CROSS-REFERENCE TO RELATED APPLICATIONS

This application is based upon and claims the benefit of priority from Japanese Patent Application No. 2022-147233, filed Sep. 15, 2022, the entire contents of which are incorporated herein by reference.

FIELD

Embodiments described herein relate generally to a magnetic disk device.

BACKGROUND

Usually, in magnetic disk drives, the protrusion amount of the read head is measured, and the protrusion sensitivity of the read head is specified according to the measured protrusion amount. For write heads, the protrusion amount of the write head is specified by applying the protrusion sensitivity of the read head directly to the write head without measuring the protrusion amount. In this case, the protrusion amount of the write head is not a measured value, which may cause an error with the actual protrusion amount.

BRIEF DESCRIPTION OF THE DRAWINGS

FIG. 5 is a flowchart showing an example of a procedure for determining power to be supplied to each heater.

DETAILED DESCRIPTION

Figure 1:
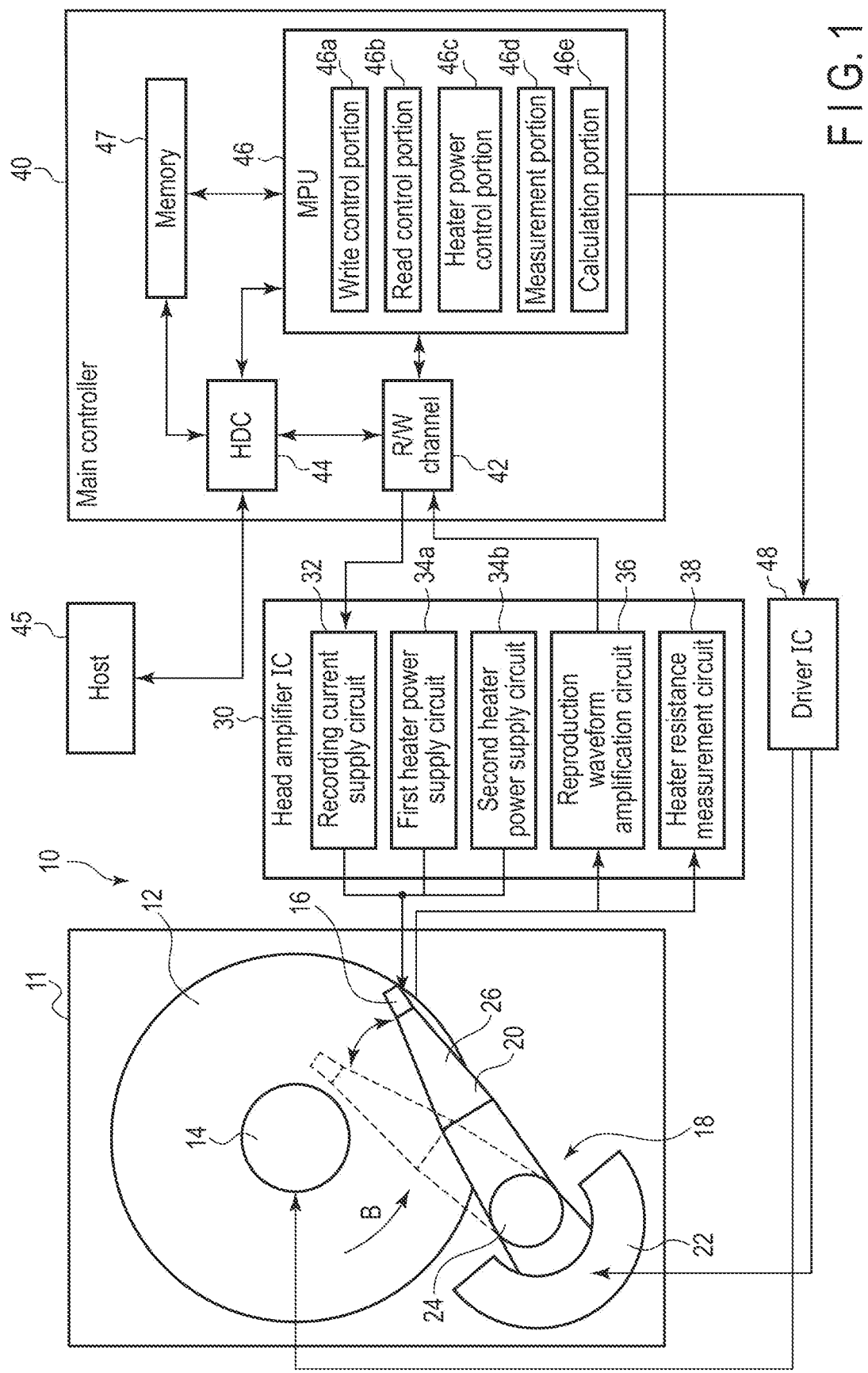
FIG. 1 is a block diagram showing a configuration of a magnetic disk device according to an embodiment.

Embodiments will be described hereinafter with reference to the accompanying drawings.

In general, according to one embodiment, a magnetic disk device comprises a magnetic disk, a magnetic head including a write head which writes data to the magnetic disk, a read head which reads data from the magnetic disk, a first heater which adjusts a flying height of the write head, a second heater which adjusts a flying height of the read head and a controller which controls powers supplied to the first heater and the second heat, and controls a power value of the power supplied to the first heater according to a ratio between an electric resistance value of the first heater and an electric resistance value of the second heater.

A magnetic disk device according to an embodiment will be described below with reference to the drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is a block diagram showing a configuration of a magnetic disk device 10 according to an embodiment.

As shown in FIG. 1, the magnetic disk device 10 comprises a rectangular housing 11, a magnetic disk 12 disposed as a recording medium in the housing 11, a spindle motor 14 which supports and rotates the magnetic disk 12, and a plurality of magnetic heads 16 which write (record) and read (reproduce) data with respect to the magnetic disk 12.

The magnetic disk device 10 includes a head actuator 18 which moves and positions a respective magnetic head 16 on an arbitrary track on the magnetic disk 12. The head actuator 18 includes a carriage assembly 20 which movably supports the magnetic head 16 and a voice coil motor (VCM) 22 which pivots the carriage assembly 20.

The carriage assembly 20 includes a bearing portion 24 rotatably supported by the housing 11 and a plurality of suspensions 26 extending from the bearing portion 24. The magnetic head 16 is supported at a distal end of each suspension 26.

The magnetic disk device 10 comprises a head amplifier IC (preamplifier) 30 which drives the magnetic heads 16, a main controller 40 and a driver IC 48. The head amplifier IC 30 is electrically connected to the magnetic heads 16. The head amplifier IC 30 comprises a recording current supply circuit 32 which supplies recording current to the recording coil of each of the magnetic heads 16, a first heater power supply circuit 34a which supplies power to a first heater H1, which will be described later, a second heater power supply circuit 34b which supplies power to the second heater H2, which will be described later, a reproduction signal amplification circuit 36 which amplifies a signal read by a magnetic head, and a heater resistance measurement circuit 38 which can measure electrical resistance values of the first heater H1 and the second heater H2.

The main controller 40 and the driver IC 48 are configured, for example, on a control circuit board, not shown, provided on a rear surface side of the housing 11. The main controller 40 comprises an R/W channel 42, a hard disk controller (HDC) 44, a microprocessor (MPU) 46, a memory 47 and the like. The main controller 40 is electrically connected to the VCM 22 and the spindle motor 14 via a driver IC 48. The HDC 44 can be connected to a host computer (host) 45.

The R/W channel 42 is a signal processing circuit for read/write data. The HDC 44 controls data transfer between the host 45 and the R/W channel 42 in response to the instruction from the MPU 46. The HDC 44 is electrically connected to, for example, the R/W channel 42, the MPU 46, the memory 47 and the like. The memory 47 includes a volatile memory and a nonvolatile memory. For example, the memory 47 includes a buffer memory formed using a DRAM, and a flash memory. The memory 47 stores programs and parameters necessary for processing by the MPU 46.

The MPU 46 is a main control portion of the magnetic disk device 10 and executes servo control necessary for controlling read/write operations and positioning of the magnetic head 16. The MPU 46 includes a write control portion 46a which controls write processing, a read control portion 46*b* which controls read processing, a heater power control portion 46*c* which controls the power values of the powers supplied to the first heater H1 and the second heater H2, which will be described later, a measurement portion 46*d* which measures electrical resistance values and the like of the heaters H1 and H2, and a calculation portion 46*e* which calculates the power values of the powers supplied to the heaters H1 and H2 based on the electrical resistance measured by the measurement portion 46*d*, and the like. The write control portion 46*a* controls the data write processing in accordance with commands from the host 45 and the like. More specifically, the write control portion 46*a* controls the VCM 22 via the driver IC 48 to position the magnetic head 16 at a predetermined position on the magnetic disk 12 and writes data.

The read control portion 46*b* controls the data read processing in accordance with commands from the host 45 and the like. More specifically, the read control portion 46*b* controls the VCM 22 via the driver IC 48 to position the magnetic head 16 at a predetermined position on the magnetic disk 12 and reads data.

The heater power control portion 46*c* controls the power value of the power to be supplied to each of the heaters H1 and H2 based on the power value (or ratio of the power) calculated by the calculation portion 46*e*. The measurement portion 46*d* measures, in addition to the electrical resistance value of each of the heaters H1 and H2, error rate, overwrite, recording track width, erase track width and the like.

The measurement portion 46*d* controls the heater resistance measurement circuit 38 to measure the electrical resistance value of each of the heaters H1 and H2.

Here, the error rate is, for example, the bit error rate.

The overwrite is, for example, a decibel representation of, when on top of a first recording pattern of a certain frequency, a second recording pattern of a different frequency from that of the first pattern is written, the amount of remaining of the first recording pattern without being erased.

Next, the recording track width and erase track width will be explained.

Figure 2:
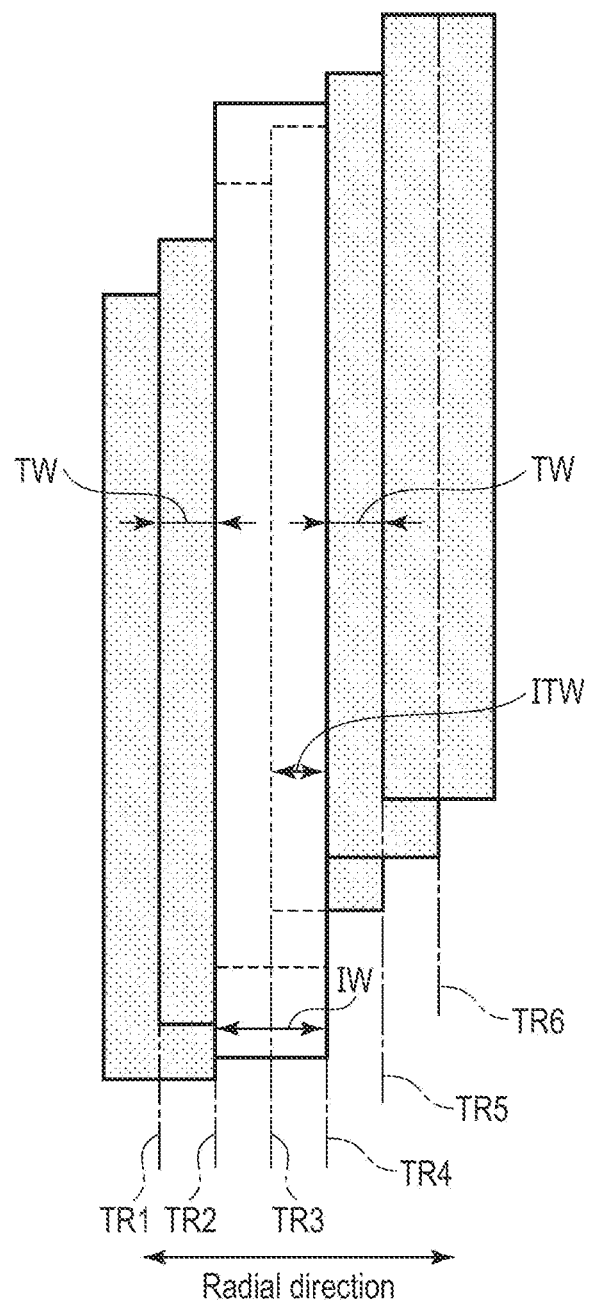
FIG. 2 is a diagram showing an example of write process.

FIG. 2 is a diagram showing an example of a write process. FIG. 2 shows an example of a shingle write magnetic recording (SMR), which illustrates tracks TR1, TR2, TR3, TR4, TR5 and TR6 are continuously overwritten in order in one direction along a radial direction, and thereafter an erase pattern is written on the track TR3. The record track width TW is the width of the data written to a track along the radial direction of magnetic disk 12. The erase track width ITW is the radial width of the data written to a track in a region which overlaps the erase pattern. For example, the erase track width ITW is the value obtained by subtracting the recorded track width TW from the track width IW of the erase pattern along the radial direction. Note that the recording method of the magnetic disk device 10 of this embodiment is not limited to SMR, but may as well be of, for example, a conventional magnetic recording (CMR) in which data can be randomly written.

Figure 3:
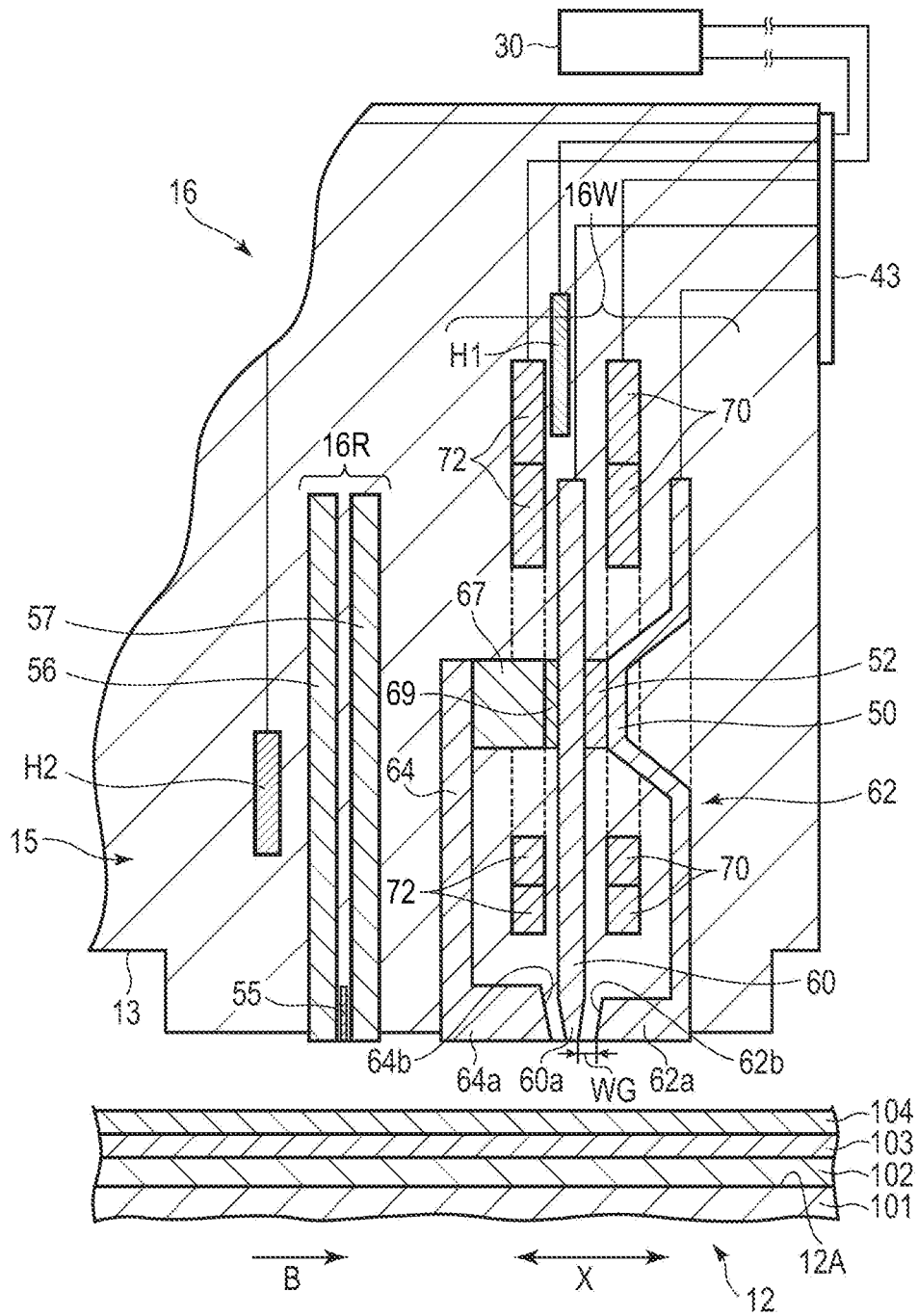
FIG. 3 is an enlarged cross-sectional view of a magnetic head and a magnetic disk of the magnetic disk device in the embodiment.

FIG. 3 is an enlarged cross-sectional view of a magnetic head 16 and a magnetic disk 12 of the magnetic disk device 10 according to the embodiment. As shown in FIG. 3, the magnetic head 16 includes a write head 16W and a read head 16R formed by a thin-film process on an end portion of the slider 15, and is formed as a separated type head. The slider 15 includes an air bearing surface (ABS: head surface) 13, which is a surface opposing a recording surface 12A of the magnetic disk 12 to fly from the recording surface 12A of the magnetic disk 12. The write head 16W writes data on the magnetic disk 12. The read head 16R reads out data recorded on the magnetic disk 12.

The magnetic disk 12 is configured as a perpendicular magnetic recording medium. The magnetic disk 12 is formed into a discoidal shape of, for example, 96 mm (about 3.5 inches) in diameter, and includes a substrate 101 made of a non-magnetic material. On each of the surfaces (recording surfaces 12A) of the substrate 101, a soft magnetic layer 102 made of a material exhibiting soft magnetic properties as an underlying layer, and a perpendicular magnetic recording layer 103 having magnetic anisotropy in a direction perpendicular to the surface of the magnetic disk 12 and a protective film 104 are stacked as upper layers in order. The magnetic disks 12 are coaxially engaged with each other on the hub of a spindle motor 14. The magnetic disks 12 are rotated by the spindle motor 14 in a direction indicated by arrow B at a predetermined speed (see FIG. 1).

The read head 16R includes a magnetoresistive effect element 55, a first magnetic shield film 56 and a second magnetic shielding film 57 arranged to sandwich the magnetoresistive effect element 55 along a longitudinal direction X of a recording track formed on the perpendicular magnetic recording layer 103. The magnetoresistive element 55 and each of the magnetic shield films 56 and 57 extend approximately perpendicular to the ABS 13. Lower end portions (distal end portions) of the magnetoresistive effect element 55 and each of the magnetic shield films 56 and 57 protrude slightly from the ABS 13.

The write head 16W includes a main magnetic pole 60, a return magnetic pole 62, a non-conductor 52, a leading magnetic pole 64, a second connection portion 67, a first recording coil 70, and a second recording coil 72. The main magnetic pole 60, the return magnetic pole 62 and the leading magnetic pole 64 are formed of a highly magnetic permeable material. The main magnetic pole 60 and the return magnetic pole 62 constitute a first magnetic core which forms a magnetic path, and the main magnetic pole 60 and the leading magnetic pole 64 constitute a second magnetic core which forms a magnetic path.

The main magnetic pole 60 extends approximately perpendicular to the ABS 13. A distal end portion 60*a* of the main magnetic pole 60, located on an ABS 13 side is tapered down toward the ABS 13 to form a columnar shape which is narrower in width than the other parts. The distal end portion 60*a* of the main magnetic pole 60 protrudes slightly from the ABS 13 of the slider 15.

The return magnetic pole 62 is provided to efficiently close the magnetic path via the soft magnetic layer 102 of the magnetic disk 12 directly underneath the main magnetic pole 60. The return magnetic pole 62 is formed into an approximately L-shape, and a distal end portion 62*a* thereof is formed into a slender rectangular shape. The distal end portion 62*a* of the return magnetic pole 62 protrudes slightly from the ABS 13 of the slider 15. The distal end portion 62*a* includes a leading-side end surface (magnetic pole end surface) 62*b* opposing the distal end portion 60*a* of the main magnetic pole 60 with a write gap WG therebetween. The leading-side end surface 62*b* extends perpendicular or slightly inclined to the ABS 13.

The return magnetic pole 62 includes a first connection portion 50 connected to the main magnetic pole 60. The first connection portion 50 is magnetically connected to an upper part of the main magnetic pole 60, that is, a part of the main magnetic pole 60, which is away from the ABS 13, via the non-conductor 52. The first recording coil 70 is wound around the first connection portion 50, for example, in the first magnetic core. When writing signals to the magnetic disk 12, a write current is allowed to flow to the first recording coil 70, and thus the first recording coil 70 excites the main magnetic pole 60 and causes a magnetic flux to flow to the main magnetic pole 60.

The leading magnetic pole 64 is provided on a leading side of main magnetic pole 60 so as to oppose the main magnetic pole 60. The leading magnetic pole 64 is formed in an approximately L-shape, and the distal end portion 64a on the ABS 13 side is formed into a slender rectangular shape. The distal end portion 64a protrudes slightly from the ABS 13 of the slider 15. The distal end portion 64a includes a trailing-side end surface (magnetic pole end surface) 64b opposing the distal end portion 60a of the main magnetic pole 60 with a gap therebetween.

Further, the leading magnetic pole 64 includes a second connection portion 67 joined to the main magnetic pole 60 at a position away from the ABS 13. The second connection portion 67 is formed, for example, of a soft magnetic material and is magnetically connected to an upper part of the main magnetic pole 60, that is, the part of the main magnetic pole 60, which is away from the ABS 13, via a non-conductor 69. Thus, the second connection portion 67 forms a magnetic circuit together with the main magnetic pole 60 and the leading magnetic pole 64. The second recording coil 72 is wound, for example, around the second connection portion 67 so as to apply a magnetic field to the magnetic circuit.

Further, the magnetic head 16 includes a first heater H1 and a second heater H2. As shown in FIGS. 1 and 3, the first heater H1 and the second heater H2 are each connected to the head amplifier IC 30 via wiring and connection terminals 43. Desired power is supplied to the first heater H1 from the first heater power supply circuit 34a of the head amplifier IC 30, and desired power is supplied to the second heater H2 from the second heater power supply circuit 34b.

Figure 4:
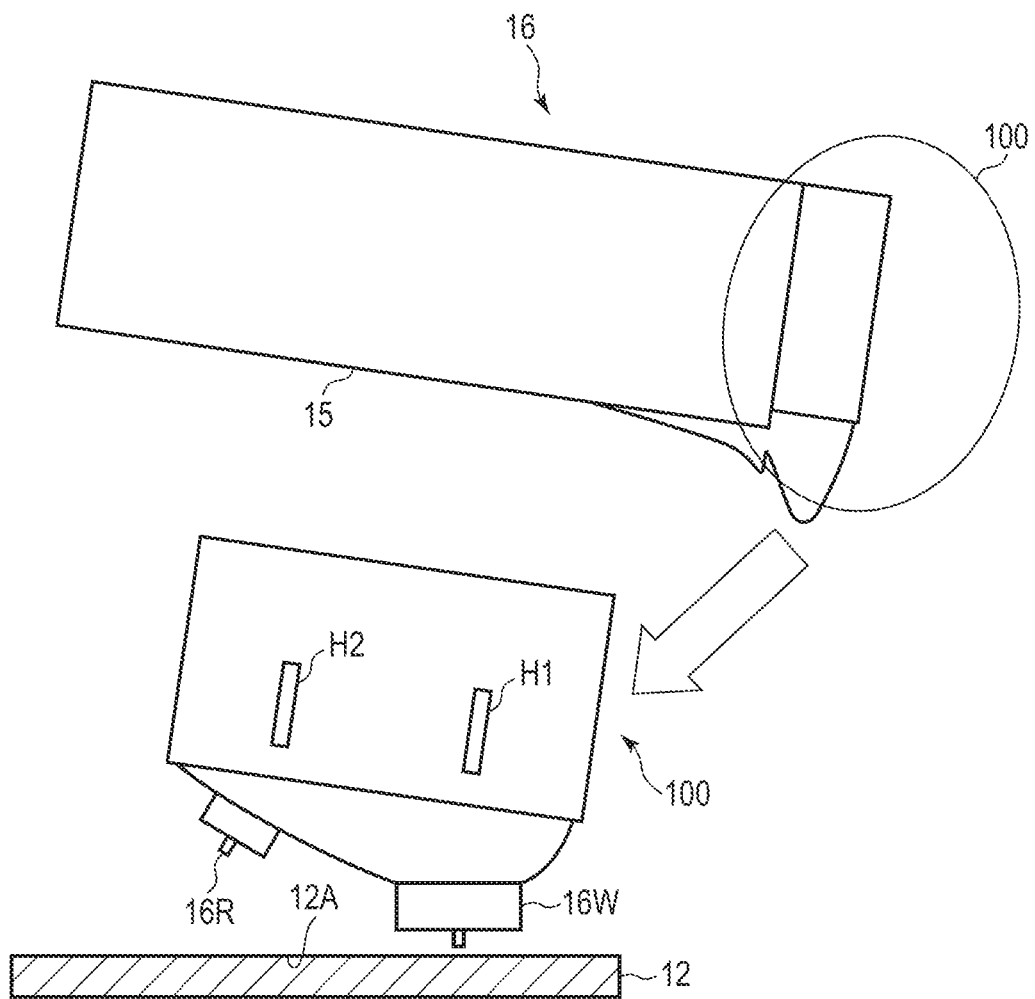
FIG. 4 is a side view of the magnetic head and magnetic disk of the magnetic disk device.

FIG. 4 is a side view showing the magnetic head 16 and the magnetic disk 12 of the magnetic disk device 10. In FIG. 4, an enlarged cross-sectional view of a head portion 100 of the magnetic head is shown as pointed by the arrow. FIG. 4 also illustrates the first heater H1 and the second heater H2 while the power being supplied thereto.

As shown in FIG. 4, when power is supplied to the heaters H1 and H2, each of the heaters H1 and H2 expands and thus the head surfaces of the write head 16W and the read head 16R protrude toward the recording surface 12A of the magnetic disk 12. In this manner, the gap between the head surface of each of the write head 16W and the read head 16R and the recording surface 12A of the magnetic disk 12 is adjusted. That is, the first heater H1 adjusts the flying height of the write head 16W by heating the area around the write head 16W, and the second heater H2 adjusts the flying height of the read head 16R by heating the area around the read head 16R. The power values and the ratio of the powers respectively supplied to the first heater H1 and the second heater H2 are controlled by the MPU 46.

The control of the power values and the ratio of the powers supplied to the heater H1 and H2 by the MPU 46 will be explained in detail.

It is known that there is a correlation between the difference between the protrusion amount of the write head 16W and that of the read head 16R (the first difference) when power is supplied to the first heater H1 and the second heater H2 and the difference between the electrical resistance value of the first heater H1 and that of the second heater H2 (the second difference). The above-described correlation can be obtained off-line. For example, the correlation is a formula calculated in advance by a magnetic disk device 10 different from the product magnetic disk device 10. An example of the correlation is that when the second difference is larger, the first difference is larger. For example, in the case where the electrical resistance value of the first heater H1 is greater than that of the second heater H2, here, when the same magnitude of power is supplied to the first and second heaters H1 and H2, the heating temperature of the first heater H1 is higher than that of the second heater H2. That is, when the electrical resistance value of the first heater H1 is greater than that of the second heater H2, the protrusion amount of the write head 16W is greater than that of the lead head 16R. Therefore, when the difference between the electrical resistance value of one heater and that of the other heater is greater, the difference in the protrusion amount is also greater.

On the other hand, when the distance between the read head 16R and the magnetic disk 12 (the flying height of the read head 16R) changes, the resolution of the data read by the read head 16R changes. Further, it is known that the reproduction amplitude of the signal read by the read head 16R increases as the distance between the read head 16R and the magnetic disk 12 is closer. The relationship between the reproduction amplitude and the distance can be calculated by Wallace's formula provided below. Note here that ASP represents change in flying height, $\lambda$ for the wavelength of the recording pattern, LN for the natural logarithm Log e, V2 for the reproduction amplitude at the touchdown point, and V1 for the initial reproduction amplitude when no power is supplied.

$$\Delta SP = \lambda/(2\pi) \times LN(V2/V1)$$

In other words, with the above-provided equation, the flying height of the read head 16R can be calculated from the regeneration amplitude. Further, from the flying height of the read head 16R, the protrusion amount of the read head 16R can also be specified. Note that the touchdown means that the magnetic head 16 (the write head 16W or read head 16R) is brought into contact with magnetic disk 12, and the above-mentioned touchdown point is the state in which the read head 16R is in contact with the magnetic disk 12.

As described above, the MPU 46 can specify the protrusion amount of the write head 16W from the first difference (the difference in the protrusion amount) and the protrusion amount of the read head 16R. The MPU 46 controls the power values (or ratio) of the powers respectively supplied to the first heater H1 and the second heater H2 according to the relationship between the electrical resistance value of the first heater H1 and that of the second heater H2, and thus the MPU 46 can adjust the protrusion amount of each of the write head 16W and the read head 16R.

The procedure for determining the power (power value or ratio) to be supplied to each of the heater H1 and the heater H2 will be explained.

Figure 6:
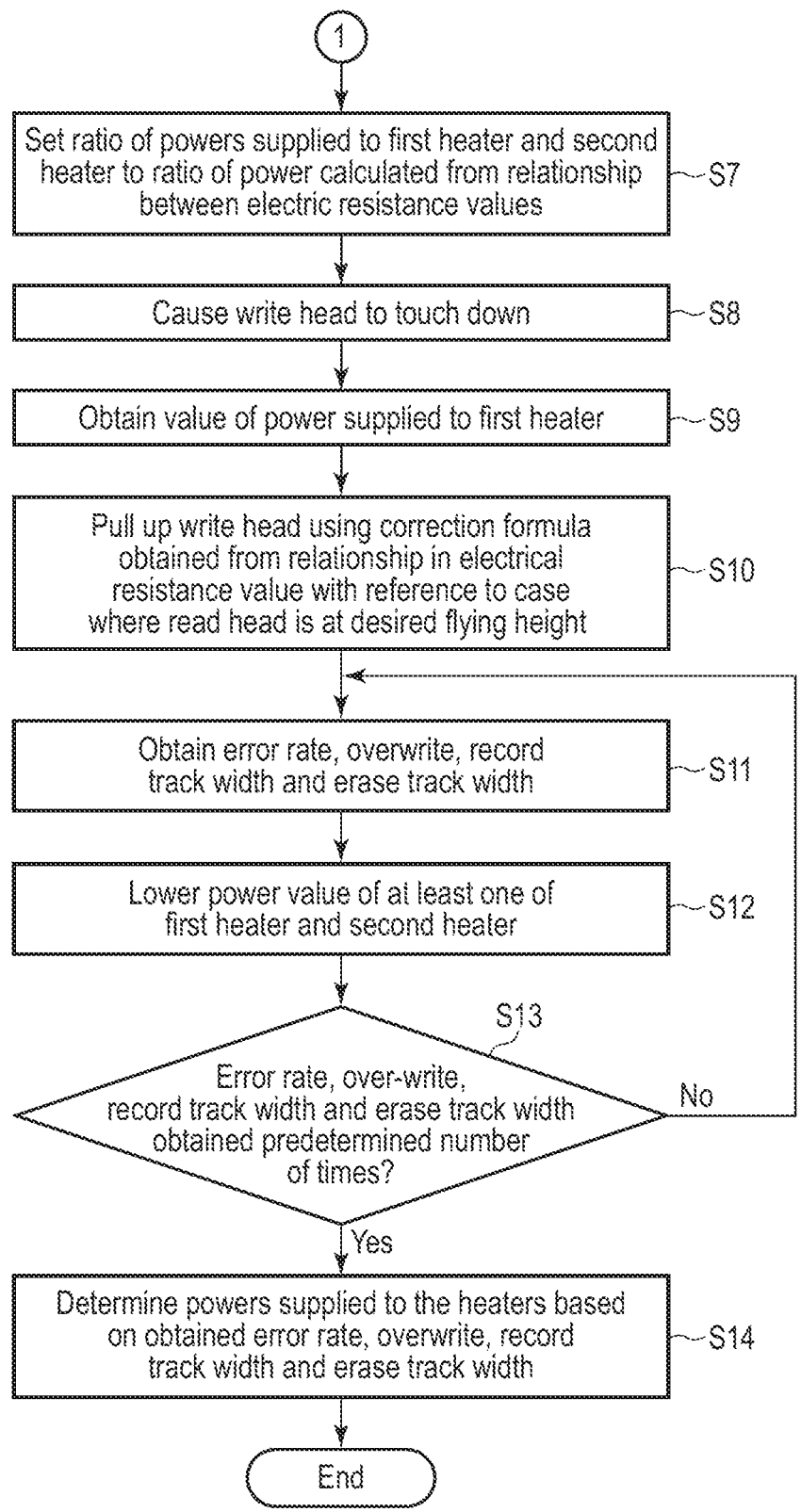
FIG. 6 is a flowchart showing an example of a procedure for determining the power to be supplied to each heater, which follows that of FIG. 5.

FIG. 5 is a flowchart showing an example of the procedure for determining the power to be supplied to each of the heaters H1 and H2. FIG. 6 is a flowchart showing an example of the procedure for determining the power to be supplied to each of the heaters H1 and H2, which follows that shown in FIG. 5. As shown in FIGS. 5 and 6, first, the main controller 40 obtains the electrical resistance values of the first heater H1 and the second heater H2 (S1).

Next, from the relationship between the electrical resistance values of the first and second heaters (in terms of, for example, ratio and difference), the main controller 40 calculates the ratio of the powers input to the first heater H1 and the second heater H2 (S2). For example, in the case where the ratio between the power W1 supplied to the first heater H1 and the power W2 supplied to the second heater H2 is an inverse ratio of the ratio of the electrical resistance value R1 of the first heater H1 and the electrical resistance value R2 of the second heater H2, by the correlation calculated in advance, if R1:R2=10:8, then, the ratio of the power is calculated as W1:W2=8:10.

Next, the main controller 40 supplies the power to the second heater H2 to cause the read head 16R to touch down (S3). At this time, the ratio of the power is set to such a ratio that does not cause the write head 16W to touch down. That is, the write head 16W has not yet touched down. Thereafter, the main controller 40 obtains a power value W2a of the power supplied to the second heater H2 at the time of the touchdown of the read head 16R (S4). Here, for example, the power value W2a is set to 100 mW.

Subsequently, the main controller 40 decreases the electric power supplied to the second heater H2 while monitoring the flying height of the read head 16R calculated from the output of the read head 16R, to pull up the read head 16R to the desired flying height (S5). Then, when the read head 16R is at the desired flying height, the main controller 40 obtains the power value W2b of the power supplied to the second heater H2 (S6). For example, the power value W2b at this time is set to 80 mW.

Next, the main controller 40 (MPU 46) sets the ratio of the powers respectively supplied to the first heater H1 and the second heater H2 to the ratio calculated in step S2 (S7). Further, the main controller 40 increases the power supplied to the first heater H1 to cause the write head 16W to touch down (S8), and obtains the power value W1a of the power supplied to the first heater H1 when the write head 16W touches down (S9). For example, the power W1a at this time is set to 80 mW. Note here that, from the ratio of the power obtained in step S2 (for example, W1:W2=8:10), the power value W1a of the power supplied to the first heater H1 at the time of touchdown may be calculated.

Next, the main controller 40 pulls up the write head 16W (S10) using a correction formula (for example, in terms of the ratio of the power) obtained from the relationship of the electrical resistance values of the first and second heaters, with reference to the case where the read head 16R is at the desired flying height. For example, the power value W2b of the power supplied to the second heater H2 in the case where the read head 16R is at the desired flying height is 80 mW (S6). From the ratio of the power determined in step S2 (W1:W2=8:10), the power value W1b of the power supplied to the first heater H1 is 64 mW.

The main controller 40 obtains the error rate, overwrite, record track width and erase track width (S11). Note that the structure is not limited to obtaining all of the error rate, overwrite, record track width and erase track width, but one of the error rate, overwrite, record track width and erase track width may be obtained. Hereinafter, the description "error rate, overwrite, record track width, and erase track width" may as well be rephrased as "at least one of the error rate, overwrite, record track width and erase track width".

Next, the main controller 40 lowers the power value of at least one of the powers to the first heater H1 and the second heater H2 by a predetermined amount (S12). With this structure, at least one of the write head 16W and the read head 16R is pulled up. After that, it is determined whether the error rate, over-write, record track width and erase track width have been obtained a predetermined number of times (S13).

When they have not been obtained the predetermined number of times (S13), steps S11 and S12 are repeated.

If they have been obtained the predetermined number of times (S13), the main controller 40 determines the powers (the power values or ratio) to be supplied to the heaters H1 and H2 according to the obtained error rate, overwrite, record track width and erase track width (S14). For example, the power values for the case where the error rate, overwrite, recording track width and erase track width fall within the allowable ranges are determined.

According to the magnetic disk device 10 configured as described above, the MPU 46 controls the power values or ratio of the powers supplied to the first heater H1 and the second heater H2 according to the relationship between the electrical resistance value of the first heater H1 and the electrical resistance value of the second heater H2. With this structure, the accuracy in control of the protrusion amount of the write head 16W can be improved, thereby making it possible to obtain a highly reliable magnetic disk device 10.

Further, the power values or ratio of the powers supplied to the heaters are determined in consideration of the error rate, overwrite, record track width, erase track width and the like. In this manner, write errors, rewrite operations and the like can be suppressed, thus making it possible to improve the write performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A magnetic disk device comprising:
 a magnetic disk;
 a magnetic head including a write head which writes data to the magnetic disk, a read head which reads data from the magnetic disk, a first heater which adjusts a flying height of the write head, a second heater which adjusts a flying height of the read head; and
 a controller which controls powers supplied to the first heater and the second heat, and controls a power value of the power supplied to the first heater according to a ratio between an electric resistance value of the first heater and an electric resistance value of the second heater,
 wherein
 the controller determines power values of the powers supplied to the first heater and the second heater according to the ratio and a change in error rate when the power value of the power supplied to at least one of the first heater and the second heater is changed.

2. The magnetic disk device of claim 1, wherein
 the controller controls a ratio of powers respectively supplied to the first heater and the second heater according to the ratio between the electric resistance value of the first heater and the electric resistance value of the second heater.

3. A magnetic disk device comprising:
 a magnetic disk;
 a magnetic head including a write head which writes data to the magnetic disk, a read head which reads data from the magnetic disk, a first heater which adjusts a flying height of the write head, a second heater which adjusts a flying height of the read head; and a controller which controls powers supplied to the first heater and the second heat, and controls a power value of the power supplied to the first heater according to a ratio between an electric resistance value of the first heater and an electric resistance value of the second heater, wherein the controller determines power values of the powers supplied to the first heater and the second heater according to the ratio and a change in overwrite when the power value of the power supplied to at least one of the first heater and the second heater is changed.

4. The magnetic disk device of claim 3, wherein
the controller controls a ratio of powers respectively supplied to the first heater and the second heater according to the ratio between the electric resistance value of the first heater and the electric resistance value of the second heater.

5. A magnetic disk device comprising:
a magnetic disk;
a magnetic head including a write head which writes data to the magnetic disk, a read head which reads data from the magnetic disk, a first heater which adjusts a flying height of the write head, a second heater which adjusts a flying height of the read head; and
a controller which controls powers supplied to the first heater and the second heat, and controls a power value of the power supplied to the first heater according to a ratio between an electric resistance value of the first heater and an electric resistance value of the second heater, wherein the controller determines power values of the powers supplied to the first heater and the second heater according to the ratio and a change in track width when the power value of the power supplied to at least one of the first heater and the second heater is changed.

6. The magnetic disk device of claim 5, wherein
the controller controls a ratio of powers respectively supplied to the first heater and the second heater according to the ratio between the electric resistance value of the first heater and the electric resistance value of the second heater.

7. A magnetic disk device comprising:
a magnetic disk;
a magnetic head including a write head which writes data to the magnetic disk, a read head which reads data from the magnetic disk, a first heater which adjusts a flying height of the write head, a second heater which adjusts a flying height of the read head; and
a controller which controls powers supplied to the first heater and the second heat, and controls a power value of the power supplied to the first heater according to a ratio between an electric resistance value of the first heater and an electric resistance value of the second heater, wherein the controller determines power values of the powers supplied to the first heater and the second heater according to the ratio and a change in erase track width when the power value of the power supplied to at least one of the first heater and the second heater is changed.

8. The magnetic disk device of claim 7, wherein
the controller controls a ratio of powers respectively supplied to the first heater and the second heater according to the ratio between the electric resistance value of the first heater and the electric resistance value of the second heater.

* * * * *